US005094268A

United States Patent [19]

Morel et al.

[11] Patent Number: 5,094,268

[45] Date of Patent: Mar. 10, 1992

[54] REGULATOR HAVING AN ELECTROHYDRAULIC CONNECTION PLATE

[75] Inventors: Michel M. J. Morel, Dammarie Les Lys; Roland Trenet, Montgeron, both of France

[73] Assignee: Societe Nationale d'Etude et de Construction de Moteurs d'Aviation "S.N.E.C.M.A.", Paris, France

[21] Appl. No.: 684,280

[22] Filed: Apr. 12, 1991

[30] Foreign Application Priority Data

Apr. 19, 1990 [FR] France ................................ 90 04989

[51] Int. Cl.[5] ........................ F16K 11/00; F16K 31/02

[52] U.S. Cl. ........................................ 137/560; 137/884

[58] Field of Search ......................... 137/271, 560, 884

[56] References Cited

U.S. PATENT DOCUMENTS

| | | | |
|---|---|---|---|
| 3,814,126 | 6/1974 | Klee | 137/884 |
| 4,348,942 | 9/1982 | Stoll | 137/884 X |
| 4,378,027 | 3/1983 | Weirich et al. | 137/884 X |
| 4,399,836 | 8/1983 | de Versterre et al. | 137/487.5 |
| 4,527,589 | 7/1985 | Stoll | 137/884 X |
| 4,815,496 | 3/1989 | Nishitani et al. | 137/560 X |
| 4,842,021 | 6/1989 | Stoll | 137/884 |
| 5,025,834 | 6/1991 | Stoll | 137/560 |

FOREIGN PATENT DOCUMENTS 2592432 7/1987 France .

*Primary Examiner*—John Rivell
*Attorney, Agent, or Firm*—Oblon, Spivak, McClelland, Maier & Neustadt

[57] ABSTRACT

A regulator, for example for an aircraft turbojet engine, comprises a fixed hydromechanical part, a number of external electrohydraulic elements having at least one electrical circuit and at least one hydraulic circuit, and an electrohydraulic connection plate disposed between the electrohydraulic elements and the fixed part, the connection plate having fluid passage means for communicating the hydraulic circuits of the electrohydraulic elements with respective circuits of the fixed hydromechanical part, and further means for the passage of electric cables for connecting the electrical circuits of the electrohydraulic elements to an overall electrical connection of the regulator, the cable passage means including channels in the face of the connection plate opposite the face on which the electrohydraulic elements are mounted, and the cables being held at the bottom of the channels by packing elements carried by a cover forming member, e.g. an intermediate plate or the fixed part, placed against the face of the connection plate.

7 Claims, 2 Drawing Sheets

REGULATOR HAVING AN ELECTROHYDRAULIC CONNECTION PLATE

BACKGROUND OF THE INVENTION

1. Field of the invention

The present invention relates to regulating devices, especially for turboshaft engines for aircraft, and more particularly to regulators in which all the hydromechanical functions are integrated in one part, termed a fixed part, and the electrohydraulic functions are carried out by external components rigidly secured to the fixed part and connected electrically to sources of current and hydraulically to the fixed part of the regulator.

2. Summary of the prior art

The electrical connections of these electrohydraulic components are usually external to the regulator and to the hydraulic connection plate which may be fitted between the components and the fixed part of the regulator, and are made by means of electrical cables and connectors arranged on the faces of the equipment remote from the fixed part or on the side faces of the components.

The unit with the cabling is heavy, cumbersome and difficult to handle, and the assembly or taking down of the regulator involves connecting or disconnecting the electrical connections. These tasks take up a lot of time, are detrimental to the reliability of the unit and increase the risk of damaging the connectors and cables, which are very expensive to replace.

It would therefore be useful to be able to make the connections of the external electrohydraulic elements on the regulator or its hydraulic connection plate in a manner simultaneous with the positioning of the outer elements on the regulator. It would also be useful to be able to reduce the number of the necessary electric connectors, as well as the size of the cables, so as to make maintenance work on the regulator faster, more reliable and less costly.

In this respect, French Specification No. 2 592 432 has proposed regrouping all of the external electrohydraulic or electropneumatic equipment on the same flat surface of the regulator, and interposing between the fixed part and the external equipment an electrical connection plate constituted by a metallized printed circuit board. The hydraulic connections are made in a fluid-tight manner between the equipment and the fixed part through apertures in the printed circuit board.

However, this arrangement has a certain number of drawbacks as the printed circuit board has been found to be fragile under compression and, in addition, has a tendency to swell in contact with fuel. After a certain period of use, this may lead to the metallized areas of the board losing adherence. Moreover, such an arrangement requires contact means between the wires and the printed circuit which should be self-cleaning and, inevitably, form a weak point in the electrical circuit.

SUMMARY OF THE INVENTION

With the aim of avoiding these drawbacks, according to the present invention there is provided a regulator, for example for an aircraft turbojet engine, comprising a fixed hydromechanical part, a number of external electrohydraulic elements having at least one electrical circuit and at least one hydraulic circuit, and a hydraulic connection plate disposed between the electrohydraulic elements and the fixed hydromechanical part, the electrohydraulic elements being mounted on a first face of the hydraulic connection plate remote from the fixed hydromechanical part, and the hydraulic connection plate having fluid passage means for communicating the hydraulic circuits of the electrohydraulic elements with respective circuits of the fixed hydromechanical part, the hydraulic connection plate also having means for the passage of electric cables for connecting the electrical circuits of the electrohydraulic elements to an overall electrical connector of the regulator, the cable passage means including channels in a second face of the hydraulic connection plate opposite the first face on which the electrohydraulic elements are mounted, and the regulator including a cover forming member placed against the second face of the hydraulic connection plate containing the channels, the cover forming member carrying packing elements which project into the channels to hold the electrical cables at the bottom thereof.

Thus, the invention proposes making use of normal cables for the electrical connections between the electrohydraulic elements and the overall central connector of the regulator, and housing them in channels in a hydraulic connection plate between the elements and the fixed part of the regulator, the cables being held in the channels by vibration damping packing elements to prevent them suffering the drawbacks inherent with any cabling in turbojet engines, i.e. premature wear due to friction caused by vibrations.

The cover forming member may be an intermediate plate disposed between the hydraulic connection plate and the fixed hydromechanical part of the regulator, the intermediate plate having holes through which the fluid passage means of the hydraulic connection plate communicate with the respective circuits of the fixed hydromechanical part, and the packing elements being fixed to the face of the intermediate plate facing the second face of the hydraulic connection plate in positions corresponding to the cable channels.

Alternatively, the cover forming member may be the fixed hydromechanical part of the regulator, and the packing elements are fixed to the face of the fixed hydromechanical part facing the second face of the hydraulic connection plate in positions corresponding to the cable channels.

Various embodiments of the invention will now be described, by way of example, with reference to the accompanying drawings.

DESCRIPTION OF THE PREFERRED EMBODIMENT

Figure 1:
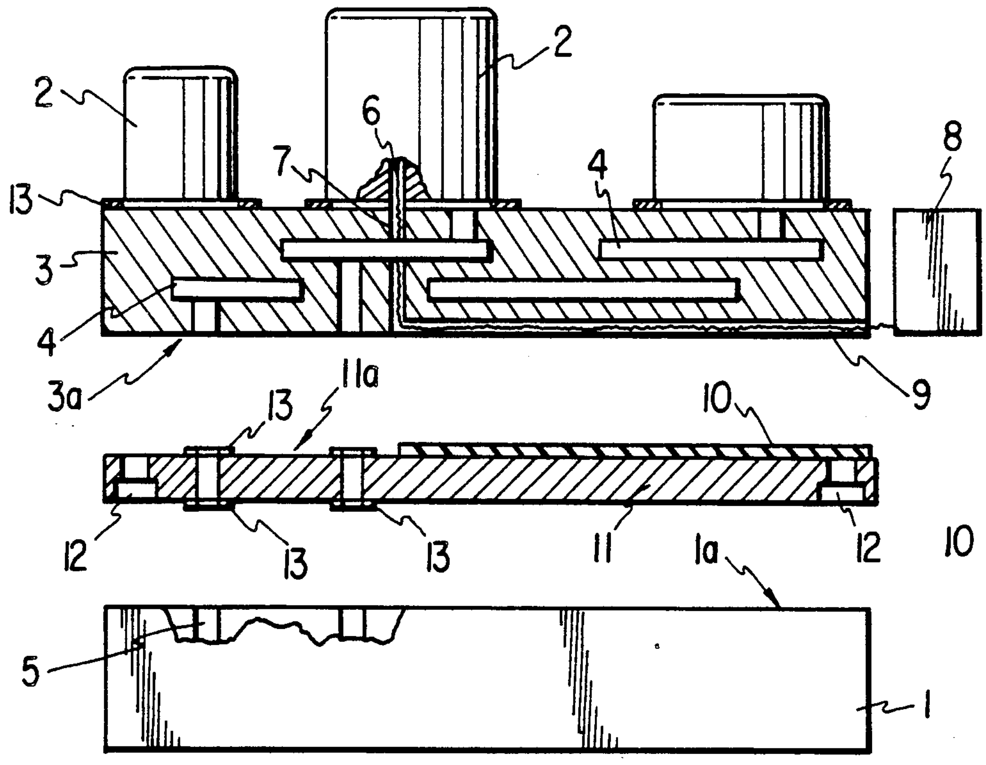
FIG. 1 is a partial cross-sectional view of a first embodiment in which the packing elements are carried by an intermediate cover member between the hydraulic connection plate and the fixed part of the regulator.

FIG. 1 shows a diagrammatic representation of a regulator having a fixed hydromechanical part 1 on which there are placed a plurality of electrohydraulic or electropneumatic elements 2 such as electrovalves, solenoid valves or the like. The elements 2 are all arranged on the outer face of a connection plate 3 which is provided with all the hydraulic and pneumatic passages 4 necessary for connecting the hydraulic and pneumatic circuits of the elements 2 to the corresponding inputs 5 of the fixed part 1 of the regulator.

The connection plate 3 may be made, for example, from superimposed metal sheets into which the passages 4 have been machined, for example by electroerosion or electrochemical machining, the sheets then being diffusion welded together to form the plate 3.

The wires 6 for electrically connecting the elements 2 to an overall connector 8 of the regulator pass through holes 7 in the plate 3 and thence along channels 9 formed in the lower surface 3*a* of the plate 3. In order to prevent frictional wear of the electrical leads 6 in the channels 9, the leads are arranged to be pressed against the bottom of the channels by means of vibration damping packing elements 10 which, in the embodiment of FIG. 1, are bonded or otherwise fixed on the upper face 11*a* of an intermediate plate 11 in positions corresponding to the channels 9, the intermediate plate 11 constituting a cover and being screwed to the lower surface 3*a* of the connection plate as indicated at 12.

The assembly formed by the connection plate 3 and the cover 11 is suitably fixed on the fixed part 1 of the regulator.

Figure 2:
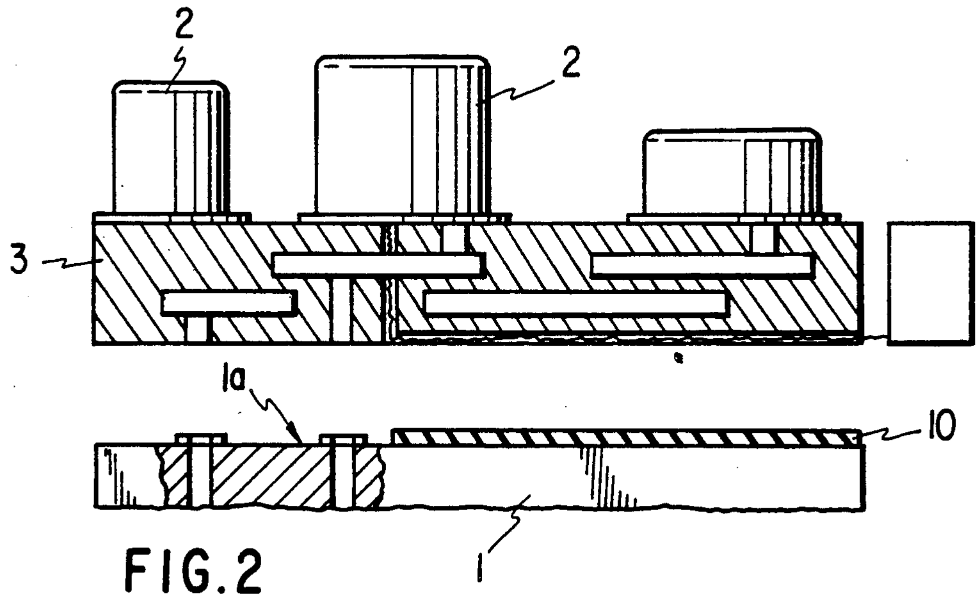
FIG. 2 is a partial cross-sectional view of a second embodiment in which the packing elements are supported directly by the upper face of the fixed part of the regulator.

In the alternative embodiment shown in FIG. 2, an intermediate cover plate 11 is not used and the flexible packing elements 10 are bonded or otherwise fixed directly onto the upper face 1*a* of the fixed regulator part 1.

Various types of vibration damping packing elements which may be used to compress the wires 6 in the channels 9 are shown in FIGS. 3*a* to 3*i*.

Figure 3A:
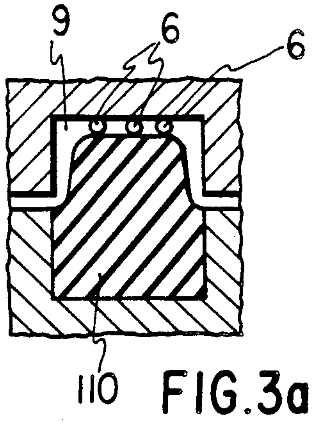
FIGS. 3*a* to 3*d* are scrap sectional views showing different possible arrangements for the packing elements.

FIG. 3*a* shows the use of a solid element 110 made of a compressible material. The element 110 is housed and glued in a groove in the surface of its support member (i.e. the cover plate 11 or the fixed part 1 of the regulator) and has a projecting part which will occupy the free space of a channel 9 fitted with its electrical cables 6.

Figure 3B:
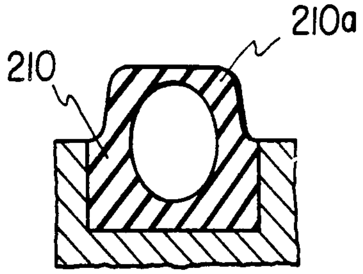

FIG. 3*b* illustrates a hollow element 210 having a flexible upper part 210*a* which can be crushed against the cables 6.

Figure 3C:
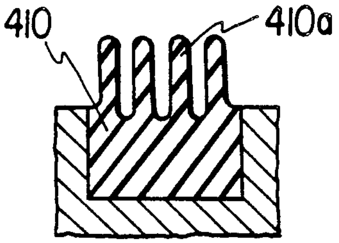
Figure 3D:
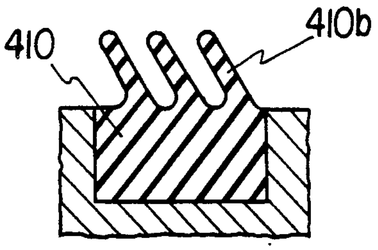

FIGS. 3*c* and 3*d* illustrate other possible alternatives comprising a solid part 410 housed in the support member groove, and flexible elements mounted on the solid part for engaging the electrical cables 6 in a channel 9. In FIG. 3*c* the flexible elements are shown as vertical deformable ribs 410*a*, and in FIG. 3*d* they are shown as slanting ribs 410*b*.

FIGS. 3*e* to 3*h* show further possible embodiments of the packing elements which are similar to the embodiments of FIGS. 3*c* and 3*d* except for the arrangement of the flexible ribs.

Figure 3E:
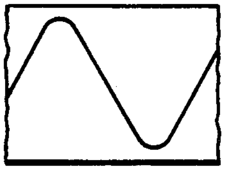
FIGS. 3*e* to 3*i* are scrap top views of other possible arrangements for the packing elements similar to those of FIGS. 3*c* and 3*d*.
Figure 3F:
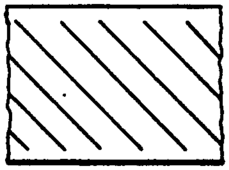
Figure 3G:
Figure 3H:
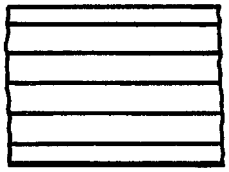

In the embodiment of FIG. 3*e* the element has a single sinusoidally shaped deformable rib, whereas in the embodiment of FIG. 3*f* there are several ribs oriented diagonally relative to the axis of the packing element. In the case of the embodiments shown in FIGS. 3*g* and 3*h* the ribs are respectively arranged transversely and axially relative to the axis of the element.

Figure 3I:
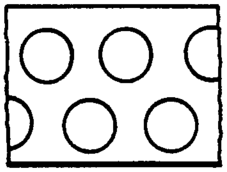

FIG. 3*i* shows a packing element in which the flexible ribs are replaced by flexible or compressible fingers or pimples.

The sealing of the hydraulic or pneumatic circuits at the junction between the connection plate 3 and the fixed regulator part 1 or the junctions between the intermediate plate 11 and both the connection plate 3 and the fixed part 1 is effected by seals 13 glued or vulcanized around the hydraulic or pneumatic ports of the fixed regulator part 1, and/or the intermediate plate 11, and/or on the connection plate 3 as appropriate.

The arrangement in accordance with the invention as just described facilitates servicing of the regulators in the workshop, as it ensures interchangeability both of the fixed part and of the connection plate fitted with the electrohydraulic elements, while also ensuring that in operation the hydraulic connections are made tightly and the electrical connections are made without wear to the cables.

We claim:

1. A regulator, for example for an aircraft turbojet engine, comprising a fixed hydromechanical part, a number of external electrohydraulic elements having at least one electrical circuit and at least one hydraulic circuit, and a hydraulic connection plate having opposed first and second faces disposed between said electrohydraulic elements and said fixed hydromechanical part, said electrohydraulic elements being mounted on said first face of said hydraulic connection plate remote from said fixed hydromechanical part, and said hydraulic connection plate having fluid passage means for communicating said hydraulic circuits of said electrohydraulic elements with respective circuits of said fixed hydromechanical part, said hydraulic connection plate also having means for the passage of electric cables for connecting said electrical circuits of said electrohydraulic elements to an overall electrical connector of said regulator, the cable passage means including channels in said second face of said hydraulic connection plate opposite said first face on which said electrohydraulic elements are mounted, and said regulator including a cover forming member placed against said second face of said hydraulic connection plate containing said channels said cover forming member carrying packing elements which project into said channels to hold said electrical cables at the bottom thereof.

2. A regulator according to claim 1, wherein said cover forming member is an intermediate plate disposed between said hydraulic connection plate and said fixed hydromechanical part of the regulator, said intermediate plate having holes through which said fluid passage means of said hydraulic connection plate communicate with the respective circuits of said fixed hydromechanical part, and said packing elements are fixed to the face of said intermediate Plate facing said second face of said hydraulic connection plate in positions corresponding to said cable channels.

3. A regulator according to claim 1, wherein said cover forming member is said fixed hydromechanical part of said regulator, and said packing elements are fixed to the face of said fixed hydromechanical part facing said second face of said hydraulic connection plate in positions corresponding to said cable channels.

4. A regulator according to claim 1, wherein said packing elements are flexible.

5. A regulator according to claim 4, wherein said packing elements are made of a compressible material.

6. A regulator according to claim 4, wherein said packing elements comprise a solid base part and flexible members mounted on said base part.

7. A regulator according to claim 6, wherein said flexible members comprise deformable ribs.

* * * * *